(12) United States Patent
Wang

(10) Patent No.: US 7,748,137 B2
(45) Date of Patent: Jul. 6, 2010

(54) WOOD-DRYING SOLAR GREENHOUSE

(76) Inventor: Yin Wang, 734 W. Pacificview Dr., Bellingham, WA (US) 98229

(*) Notice: Subject to any disclaimer, the term of this patent is extended or adjusted under 35 U.S.C. 154(b) by 27 days.

(21) Appl. No.: 12/172,248

(22) Filed: Jul. 13, 2008

(65) Prior Publication Data

US 2009/0013596 A1 Jan. 15, 2009

Related U.S. Application Data

(60) Provisional application No. 60/949,860, filed on Jul. 15, 2007.

(51) Int. Cl.
*F26B 17/00* (2006.01)
(52) U.S. Cl. .............................. 34/396; 34/381; 34/90; 34/210; 34/218; 34/239; 800/284; 435/419; 144/364; 428/292.1; 47/61; 47/64
(58) Field of Classification Search .................. 34/396, 34/90, 210, 218, 239, 134, 380, 381; 47/61, 47/64; 800/284; 435/419; 428/292.1; 144/364
See application file for complete search history.

(56) References Cited

U.S. PATENT DOCUMENTS

| | | | | |
|---|---|---|---|---|
| 487,965 A | * | 12/1892 | Piver | 34/201 |
| 1,328,655 A | * | 1/1920 | Fish, Jr. | 34/380 |
| 1,482,972 A | * | 2/1924 | Chandler | 432/91 |
| 1,556,865 A | * | 10/1925 | Muller | 34/418 |
| 1,918,682 A | * | 7/1933 | Altenkirch | 62/92 |
| 1,926,035 A | * | 9/1933 | Chesley | 131/299 |
| 1,926,036 A | * | 9/1933 | Chesley | 250/453.11 |
| 1,946,814 A | * | 2/1934 | Varley | 426/455 |
| 1,954,674 A | * | 4/1934 | Lager | 47/17 |
| 2,027,894 A | * | 1/1936 | Alcorn et al. | 118/58 |
| 2,038,008 A | * | 4/1936 | Shodron | 426/419 |
| 2,121,495 A | * | 6/1938 | Fitzalan | 422/3 |
| 2,138,690 A | * | 11/1938 | Altenkirch | 62/79 |
| 2,185,760 A | * | 1/1940 | Altenkirch | 34/396 |
| 2,292,337 A | * | 8/1942 | Ford | 174/14 R |
| 2,343,345 A | * | 3/1944 | Touton | 131/303 |
| 2,343,346 A | * | 3/1944 | Touton | 34/224 |
| 2,479,526 A | * | 8/1949 | Touton | 34/221 |
| 2,529,621 A | * | 11/1950 | Mayo | 432/62 |
| 2,543,618 A | * | 2/1951 | Wood | 34/256 |
| 2,567,983 A | * | 9/1951 | Wood | 34/256 |
| 2,688,476 A | * | 9/1954 | Mayo | 432/62 |

(Continued)

FOREIGN PATENT DOCUMENTS

CH 641743 A * 3/1984

(Continued)

OTHER PUBLICATIONS

International Search Report for PCT Application No. PCT/US08/69905 dated Oct. 3, 2008.

*Primary Examiner*—Stephen M. Gravini

(57) ABSTRACT

A method of drying comprises placing a moist material inside a substantially enclosed solar greenhouse. The greenhouse comprises at least one light transmission roof and/or wall panel that is substantially transparent to solar radiation, but resistant to convective and conductive heat transfer. The interior temperature and humidity of the greenhouse are maintained within their pre-determined ranges while the interior moisture of the greenhouse is effectively reduced to allow a controlled drying of the material. A solar greenhouse for the drying process is also disclosed.

12 Claims, 4 Drawing Sheets

U.S. PATENT DOCUMENTS

| | | | | |
|---|---|---|---|---|
| 2,810,208 A * | 10/1957 | Sadler | | 34/93 |
| 2,831,268 A * | 4/1958 | Cox | | 34/81 |
| 2,895,400 A * | 7/1959 | Topf | | 454/182 |
| 2,935,009 A * | 5/1960 | Cloud et al. | | 454/180 |
| 3,097,077 A * | 7/1963 | Melikian | | 34/93 |
| 3,103,227 A * | 9/1963 | Long | | 134/95.2 |
| 3,314,862 A * | 4/1967 | Hay | | 203/10 |
| 3,412,728 A * | 11/1968 | Thomason | | 126/620 |
| 3,450,192 A * | 6/1969 | Hay | | 165/49 |
| 3,571,943 A * | 3/1971 | Sipple | | 34/342 |
| 3,727,345 A * | 4/1973 | Smith | | 47/2 |
| 3,811,198 A * | 5/1974 | Baltes | | 34/466 |
| 3,852,891 A * | 12/1974 | Stephan | | 34/95 |
| 3,866,334 A * | 2/1975 | Huang | | 34/93 |
| 3,896,558 A * | 7/1975 | Lovgren | | 34/380 |
| 3,943,842 A * | 3/1976 | Bills et al. | | 99/473 |
| 4,015,366 A * | 4/1977 | Hall, III | | 47/1.43 |
| 4,020,565 A * | 5/1977 | Steffen | | 34/93 |
| 4,029,081 A * | 6/1977 | Strong | | 126/617 |
| 4,045,880 A * | 9/1977 | Steffen | | 34/93 |
| 4,069,593 A * | 1/1978 | Huang | | 34/93 |
| 4,077,134 A * | 3/1978 | Steffen | | 34/443 |
| 4,099,338 A * | 7/1978 | Mullin et al. | | 34/514 |
| 4,122,828 A * | 10/1978 | DiPeri | | 126/671 |
| 4,123,003 A * | 10/1978 | Winston | | 165/48.2 |
| 4,128,948 A * | 12/1978 | Wood | | 34/500 |
| 4,129,177 A * | 12/1978 | Adcock | | 165/48.2 |
| 4,148,147 A * | 4/1979 | Steffen | | 34/268 |
| 4,160,523 A * | 7/1979 | Stevens | | 126/625 |
| 4,165,966 A * | 8/1979 | Whelan et al. | | 432/121 |
| 4,223,666 A * | 9/1980 | Wasserman | | 126/618 |
| 4,236,063 A * | 11/1980 | Glucksman | | 219/400 |
| 4,246,887 A * | 1/1981 | Christiansen | | 126/614 |
| 4,253,244 A * | 3/1981 | Kranzler | | 34/554 |
| 4,279,082 A * | 7/1981 | Commander | | 34/82 |
| 4,305,235 A * | 12/1981 | Roston | | 52/2.17 |
| 4,307,519 A * | 12/1981 | Szucs et al. | | 34/473 |
| 4,321,775 A * | 3/1982 | Emerson | | 52/66 |
| 4,323,113 A * | 4/1982 | Troyer | | 165/45 |
| 4,329,789 A * | 5/1982 | Erickson | | 34/195 |
| RE31,023 E * | 9/1982 | Hall, III | | 405/37 |
| 4,347,671 A * | 9/1982 | Dias et al. | | 34/402 |
| 4,387,533 A * | 6/1983 | Green et al. | | 47/17 |
| 4,407,078 A * | 10/1983 | Takeyama et al. | | 34/601 |
| 4,430,828 A * | 2/1984 | Oglevee et al. | | 47/17 |
| 4,438,680 A * | 3/1984 | Esposito | | 454/341 |
| 4,446,853 A * | 5/1984 | Adcock | | 126/707 |
| 4,471,424 A * | 9/1984 | Persson | | 700/16 |
| 4,490,926 A * | 1/1985 | Stokes | | 34/76 |
| 4,498,526 A * | 2/1985 | Arenas | | 165/45 |
| 4,505,260 A * | 3/1985 | Metzger | | 126/637 |
| 4,510,921 A * | 4/1985 | Yano et al. | | 126/619 |
| 4,524,528 A * | 6/1985 | Ehlers | | 34/102 |
| 4,527,247 A * | 7/1985 | Kaiser et al. | | 700/278 |
| 4,567,732 A * | 2/1986 | Landstrom et al. | | 62/91 |
| 4,583,300 A * | 4/1986 | Mast | | 34/557 |
| 4,596,093 A * | 6/1986 | Esposito | | 52/86 |
| 4,597,310 A * | 7/1986 | Panttila | | 74/665 GA |
| 4,598,752 A * | 7/1986 | Esposito | | 160/272 |
| 4,606,157 A * | 8/1986 | Esposito | | 52/173.3 |
| 4,607,567 A * | 8/1986 | Esposito | | 454/347 |
| 4,609,346 A * | 9/1986 | Siccardi | | 432/222 |
| 4,616,560 A * | 10/1986 | Esposito | | 454/341 |
| 4,624,084 A * | 11/1986 | Esposito | | 52/173.3 |
| 4,627,202 A * | 12/1986 | Esposito | | 52/209 |
| 4,627,208 A * | 12/1986 | Esposito | | 52/483.1 |
| 4,678,019 A * | 7/1987 | Esposito | | 160/272 |
| 4,679,350 A * | 7/1987 | Banta | | 47/21.1 |
| 4,702,018 A * | 10/1987 | Hastings | | 34/130 |
| 4,737,103 A * | 4/1988 | Siccardi | | 432/222 |
| 4,800,653 A * | 1/1989 | Steffen | | 34/495 |
| 4,830,276 A * | 5/1989 | Sprung | | 236/49.1 |
| 4,864,783 A * | 9/1989 | Esposito | | 52/86 |
| 4,916,642 A * | 4/1990 | Kaiser et al. | | 700/278 |
| 4,981,021 A * | 1/1991 | Assaf | | 62/271 |
| 4,999,927 A * | 3/1991 | Durst et al. | | 34/448 |
| 5,001,859 A * | 3/1991 | Sprung | | 47/17 |
| 5,014,770 A * | 5/1991 | Palmer | | 165/48.2 |
| 5,065,528 A * | 11/1991 | Kaneko et al. | | 34/93 |
| 5,078,881 A * | 1/1992 | Augustine et al. | | 210/602 |
| 5,097,895 A * | 3/1992 | Assaf | | 165/104.14 |
| 5,168,640 A * | 12/1992 | Becerra | | 34/86 |
| 5,194,147 A * | 3/1993 | Augustine et al. | | 210/151 |
| 5,269,829 A * | 12/1993 | Meyer | | 71/9 |
| 5,271,225 A * | 12/1993 | Adamides | | 60/416 |
| 5,335,447 A * | 8/1994 | Bee | | 47/17 |
| 5,368,092 A * | 11/1994 | Rearden et al. | | 165/45 |
| 5,392,611 A * | 2/1995 | Assaf et al. | | 62/94 |
| 5,417,736 A * | 5/1995 | Meyer | | 71/9 |
| 5,435,377 A * | 7/1995 | Kratochvil | | 165/54 |
| 5,485,685 A * | 1/1996 | Hashimoto | | 34/348 |
| 5,517,767 A * | 5/1996 | Schechinger et al. | | 34/174 |
| 5,524,381 A * | 6/1996 | Chahroudi | | 47/17 |
| 5,540,521 A * | 7/1996 | Biggs | | 405/59 |
| 5,589,599 A * | 12/1996 | McMullen et al. | | 585/240 |
| 5,619,806 A * | 4/1997 | Warren | | 34/331 |
| 5,632,798 A * | 5/1997 | Funk et al. | | 71/9 |
| 5,678,324 A * | 10/1997 | Viitaniemi et al. | | 34/396 |
| 5,680,712 A * | 10/1997 | Kiyokawa et al. | | 34/267 |
| 5,705,140 A * | 1/1998 | Johansing, Jr. | | 423/490 |
| 5,711,819 A * | 1/1998 | Miyasaki | | 134/11 |
| 5,727,388 A * | 3/1998 | Adamides | | 60/417 |
| 5,746,653 A * | 5/1998 | Palmer et al. | | 454/186 |
| 5,784,805 A * | 7/1998 | Hashimoto | | 34/589 |
| 5,813,168 A * | 9/1998 | Clendening | | 47/17 |
| 5,836,085 A * | 11/1998 | Ben-Ezra | | 34/270 |
| 5,866,752 A * | 2/1999 | Goozner | | 204/157.3 |
| 5,873,178 A * | 2/1999 | Johnson | | 34/90 |
| 5,873,181 A * | 2/1999 | Miyasaki | | 34/470 |
| 5,931,001 A * | 8/1999 | Watanabe et al. | | 62/3.7 |
| 5,940,150 A * | 8/1999 | Faris et al. | | 349/16 |
| 5,950,326 A * | 9/1999 | Scott | | 34/309 |
| 5,979,074 A * | 11/1999 | Brunner et al. | | 34/396 |
| 5,979,170 A * | 11/1999 | Thorpe | | 62/271 |
| 5,992,048 A * | 11/1999 | DeVore et al. | | 34/522 |
| 6,039,774 A * | 3/2000 | McMullen et al. | | 48/102 A |
| 6,110,429 A * | 8/2000 | Johansing, Jr. | | 422/173 |
| 6,170,264 B1 * | 1/2001 | Viteri et al. | | 60/671 |
| 6,199,214 B1 * | 3/2001 | Campbell | | 2/181.6 |
| 6,202,321 B1 * | 3/2001 | Soucy | | 34/507 |
| 6,230,421 B1 * | 5/2001 | Reed et al. | | 34/401 |
| 6,230,480 B1 * | 5/2001 | Rollins, III | | 60/39.182 |
| 6,230,501 B1 * | 5/2001 | Bailey et al. | | 62/51.1 |
| 6,233,841 B1 * | 5/2001 | Beach | | 34/262 |
| 6,243,968 B1 * | 6/2001 | Conrad et al. | | 34/255 |
| 6,293,121 B1 * | 9/2001 | Labrador | | 62/304 |
| 6,389,772 B2 * | 5/2002 | Gleckman et al. | | 52/582.1 |
| 6,389,814 B2 * | 5/2002 | Viteri et al. | | 60/716 |
| 6,399,359 B1 * | 6/2002 | Hofstede | | 435/262.5 |
| 6,438,862 B1 * | 8/2002 | Soucy | | 34/168 |
| 6,501,014 B1 * | 12/2002 | Kubota et al. | | 136/256 |
| 6,530,160 B1 * | 3/2003 | Gookins | | 34/418 |
| 6,531,230 B1 * | 3/2003 | Weber et al. | | 428/480 |
| 6,559,903 B2 * | 5/2003 | Faris et al. | | 349/16 |
| 6,583,827 B2 * | 6/2003 | Faris et al. | | 349/16 |
| 6,598,398 B2 * | 7/2003 | Viteri et al. | | 60/716 |
| 6,671,008 B1 * | 12/2003 | Li et al. | | 349/16 |
| 6,688,018 B2 * | 2/2004 | Soucy | | 34/68 |
| 6,691,427 B1 * | 2/2004 | Fernandes et al. | | 34/60 |
| 6,695,692 B1 * | 2/2004 | York | | 454/199 |
| 6,705,043 B1 * | 3/2004 | Opdam et al. | | 47/17 |
| 6,710,823 B2 * | 3/2004 | Faris et al. | | 349/16 |
| 6,725,598 B2 * | 4/2004 | Yoneda et al. | | 47/60 |
| 6,758,211 B1 * | 7/2004 | Schmidt | | 126/652 |

| Patent No. | Date | Inventor | Class |
|---|---|---|---|
| 6,772,535 B2 * | 8/2004 | Koslow | 34/380 |
| 6,782,947 B2 * | 8/2004 | de Rouffignac et al. | 166/245 |
| 6,797,366 B2 * | 9/2004 | Hanson et al. | 428/201 |
| 6,845,569 B1 * | 1/2005 | Kim | 34/106 |
| 6,865,825 B2 * | 3/2005 | Bailey et al. | 36/88 |
| 6,868,621 B1 * | 3/2005 | Grimm et al. | 34/92 |
| 6,877,555 B2 * | 4/2005 | Karanikas et al. | 166/245 |
| 6,880,633 B2 * | 4/2005 | Wellington et al. | 166/245 |
| 6,883,251 B2 * | 4/2005 | Terrell et al. | 34/527 |
| 6,897,936 B1 * | 5/2005 | Li et al. | 349/183 |
| 6,912,018 B2 * | 6/2005 | Faris et al. | 349/16 |
| 6,915,850 B2 * | 7/2005 | Vinegar et al. | 166/272.2 |
| 6,918,442 B2 * | 7/2005 | Wellington et al. | 166/245 |
| 6,918,443 B2 * | 7/2005 | Wellington et al. | 166/245 |
| 6,922,911 B2 * | 8/2005 | Lam | 34/239 |
| 6,923,257 B2 * | 8/2005 | Wellington et al. | 166/245 |
| 6,929,067 B2 * | 8/2005 | Vinegar et al. | 166/302 |
| 6,932,155 B2 * | 8/2005 | Vinegar et al. | 166/245 |
| 6,941,677 B2 * | 9/2005 | Adrian | 34/227 |
| 6,948,562 B2 * | 9/2005 | Wellington et al. | 166/272.1 |
| 6,951,247 B2 * | 10/2005 | de Rouffignac et al. | 166/245 |
| 6,964,300 B2 * | 11/2005 | Vinegar et al. | 166/245 |
| 6,965,816 B2 * | 11/2005 | Walker | 701/16 |
| 6,966,374 B2 * | 11/2005 | Vinegar et al. | 166/272.3 |
| 6,969,123 B2 * | 11/2005 | Vinegar et al. | 299/3 |
| 6,981,548 B2 * | 1/2006 | Wellington et al. | 166/245 |
| 6,991,032 B2 * | 1/2006 | Berchenko et al. | 166/245 |
| 6,991,033 B2 * | 1/2006 | Wellington et al. | 166/245 |
| 6,991,036 B2 * | 1/2006 | Sumnu-Dindoruk et al. | 166/302 |
| 6,991,045 B2 * | 1/2006 | Vinegar et al. | 175/45 |
| 6,994,169 B2 * | 2/2006 | Zhang et al. | 166/302 |
| 6,997,518 B2 * | 2/2006 | Vinegar et al. | 299/5 |
| 7,004,247 B2 * | 2/2006 | Cole et al. | 166/60 |
| 7,004,251 B2 * | 2/2006 | Ward et al. | 166/245 |
| 7,009,665 B2 * | 3/2006 | Li et al. | 349/88 |
| 7,011,154 B2 * | 3/2006 | Maher et al. | 166/245 |
| 7,013,972 B2 * | 3/2006 | Vinegar et al. | 166/257 |
| 7,024,796 B2 * | 4/2006 | Carin et al. | 34/363 |
| 7,024,799 B2 * | 4/2006 | Perret | 34/495 |
| 7,024,800 B2 * | 4/2006 | Carin et al. | 34/576 |
| 7,028,478 B2 * | 4/2006 | Prentice, III | 60/645 |
| 7,032,660 B2 * | 4/2006 | Vinegar et al. | 166/245 |
| 7,033,781 B1 * | 4/2006 | Short | 435/69.1 |
| 7,040,397 B2 * | 5/2006 | de Rouffignac et al. | 166/245 |
| 7,040,398 B2 * | 5/2006 | Wellington et al. | 166/245 |
| 7,040,399 B2 * | 5/2006 | Wellington et al. | 166/245 |
| 7,040,400 B2 * | 5/2006 | de Rouffignac et al. | 166/245 |
| 7,043,920 B2 * | 5/2006 | Viteri et al. | 60/716 |
| 7,051,807 B2 * | 5/2006 | Vinegar et al. | 166/245 |
| 7,051,808 B1 * | 5/2006 | Vinegar et al. | 166/250.1 |
| 7,051,811 B2 * | 5/2006 | de Rouffignac et al. | 166/302 |
| 7,055,600 B2 * | 6/2006 | Messier et al. | 166/250.01 |
| 7,063,145 B2 * | 6/2006 | Veenstra et al. | 166/250.01 |
| 7,066,254 B2 * | 6/2006 | Vinegar et al. | 166/245 |
| 7,066,257 B2 * | 6/2006 | Wellington et al. | 166/272.2 |
| 7,077,198 B2 * | 7/2006 | Vinegar et al. | 166/245 |
| 7,077,199 B2 * | 7/2006 | Vinegar et al. | 166/250.01 |
| 7,086,465 B2 * | 8/2006 | Wellington et al. | 166/272.1 |
| 7,090,013 B2 * | 8/2006 | Wellington | 166/267 |
| 7,096,942 B1 * | 8/2006 | de Rouffignac et al. | 166/245 |
| 7,100,994 B2 * | 9/2006 | Vinegar et al. | 299/7 |
| 7,104,319 B2 * | 9/2006 | Vinegar et al. | 166/245 |
| 7,107,706 B1 * | 9/2006 | Bailey et al. | 36/88 |
| 7,114,566 B2 * | 10/2006 | Vinegar et al. | 166/256 |
| 7,118,852 B2 * | 10/2006 | Purdum | 435/2 |
| 7,128,153 B2 * | 10/2006 | Vinegar et al. | 166/285 |
| 7,135,332 B2 * | 11/2006 | Ouellette | 435/290.1 |
| 7,138,173 B2 * | 11/2006 | Wheatley et al. | 428/212 |
| 7,156,176 B2 * | 1/2007 | Vinegar et al. | 166/302 |
| 7,165,615 B2 * | 1/2007 | Vinegar et al. | 166/302 |
| 7,169,489 B2 * | 1/2007 | Redmond | 429/12 |
| 7,181,865 B2 * | 2/2007 | Kolega et al. | 34/572 |
| 7,182,268 B2 * | 2/2007 | Kawahara | 236/44 A |
| 7,204,041 B1 * | 4/2007 | Bailey et al. | 36/29 |
| 7,220,365 B2 * | 5/2007 | Qu et al. | 252/70 |
| 7,225,866 B2 * | 6/2007 | Berchenko et al. | 166/245 |
| 7,240,440 B2 * | 7/2007 | Delons | 34/93 |
| 7,275,569 B2 * | 10/2007 | Hobbs | 141/97 |
| 7,287,558 B2 * | 10/2007 | Hobbs | 141/97 |
| 7,340,845 B2 * | 3/2008 | Kneebone | 34/60 |
| 7,381,550 B2 * | 6/2008 | Hallberg et al. | 435/161 |
| 7,382,332 B2 * | 6/2008 | Essig et al. | 343/878 |
| 7,434,332 B2 * | 10/2008 | Morton et al. | 34/468 |
| 7,438,261 B2 * | 10/2008 | Porter | 244/31 |
| 7,461,691 B2 * | 12/2008 | Vinegar et al. | 166/60 |
| 7,487,601 B2 * | 2/2009 | Carin et al. | 34/381 |
| 7,498,398 B2 * | 3/2009 | Di et al. | 528/196 |
| 7,591,505 B2 * | 9/2009 | Onizawa et al. | 296/216.09 |
| 7,597,855 B2 * | 10/2009 | Trentacosta et al. | 422/119 |
| 7,610,692 B2 * | 11/2009 | Carin et al. | 34/388 |
| 7,612,735 B2 * | 11/2009 | Essig et al. | 343/915 |
| 7,617,617 B2 * | 11/2009 | Gorbell et al. | 34/60 |
| 7,624,801 B2 * | 12/2009 | Zubrin et al. | 166/250.15 |
| 7,625,624 B2 * | 12/2009 | Trentacosta et al. | 428/137 |
| 7,629,400 B2 * | 12/2009 | Hyman | 524/106 |
| 7,650,939 B2 * | 1/2010 | Zubrin et al. | 166/266 |
| 2001/0015061 A1 * | 8/2001 | Viteri et al. | 60/39.161 |
| 2001/0045104 A1 * | 11/2001 | Bailey et al. | 62/510 |
| 2002/0041346 A1 * | 4/2002 | Faris et al. | 349/16 |
| 2002/0085151 A1 * | 7/2002 | Faris et al. | 349/117 |
| 2002/0100836 A1 * | 8/2002 | Hunt | 244/50 |
| 2002/0118328 A1 * | 8/2002 | Faris et al. | 349/114 |
| 2002/0124431 A1 * | 9/2002 | Duhaut et al. | 34/417 |
| 2002/0144506 A1 * | 10/2002 | Viteri et al. | 60/649 |
| 2003/0005626 A1 * | 1/2003 | Yoneda et al. | 47/69 |
| 2003/0024686 A1 * | 2/2003 | Ouellette | 165/47 |
| 2003/0029185 A1 * | 2/2003 | Kopko | 62/271 |
| 2003/0035917 A1 * | 2/2003 | Hyman | 428/67 |
| 2003/0035972 A1 * | 2/2003 | Hanson et al. | 428/480 |
| 2003/0056390 A1 * | 3/2003 | Adrian | 34/79 |
| 2003/0066638 A1 * | 4/2003 | Qu et al. | 165/186 |
| 2003/0066830 A1 * | 4/2003 | Reed et al. | 219/672 |
| 2003/0079363 A1 * | 5/2003 | Soucy | 34/60 |
| 2003/0079877 A1 * | 5/2003 | Wellington et al. | 166/272.1 |
| 2003/0080604 A1 * | 5/2003 | Vinegar et al. | 299/14 |
| 2003/0093187 A1 * | 5/2003 | Walker | 701/1 |
| 2003/0098149 A1 * | 5/2003 | Wellington et al. | 166/52 |
| 2003/0098605 A1 * | 5/2003 | Vinegar et al. | 299/14 |
| 2003/0100451 A1 * | 5/2003 | Messier et al. | 507/100 |
| 2003/0102124 A1 * | 6/2003 | Vinegar et al. | 166/256 |
| 2003/0102125 A1 * | 6/2003 | Wellington et al. | 166/266 |
| 2003/0102126 A1 * | 6/2003 | Sumnu-Dindoruk et al. | 166/272.1 |
| 2003/0102130 A1 * | 6/2003 | Vinegar et al. | 166/302 |
| 2003/0111223 A1 * | 6/2003 | Rouffignac et al. | 166/256 |
| 2003/0116315 A1 * | 6/2003 | Wellington et al. | 166/256 |
| 2003/0130136 A1 * | 7/2003 | Rouffignac et al. | 507/200 |
| 2003/0131993 A1 * | 7/2003 | Zhang et al. | 166/256 |
| 2003/0131994 A1 * | 7/2003 | Vinegar et al. | 166/256 |
| 2003/0131995 A1 * | 7/2003 | de Rouffignac et al. | 166/272.1 |
| 2003/0131996 A1 * | 7/2003 | Vinegar et al. | 166/272.1 |
| 2003/0136558 A1 * | 7/2003 | Wellington et al. | 166/245 |
| 2003/0136559 A1 * | 7/2003 | Wellington et al. | 166/250.01 |
| 2003/0137181 A1 * | 7/2003 | Wellington et al. | 299/5 |
| 2003/0141066 A1 * | 7/2003 | Karanikas et al. | 166/302 |
| 2003/0141067 A1 * | 7/2003 | Rouffignac et al. | 166/302 |
| 2003/0141068 A1 * | 7/2003 | Rouffignac et al. | 166/302 |
| 2003/0142964 A1 * | 7/2003 | Wellington et al. | 392/301 |
| 2003/0146002 A1 * | 8/2003 | Vinegar et al. | 166/384 |
| 2003/0148894 A1 * | 8/2003 | Vinegar et al. | 507/200 |
| 2003/0155111 A1 * | 8/2003 | Vinegar et al. | 166/59 |
| 2003/0164239 A1 * | 9/2003 | Wellington et al. | 166/302 |
| 2003/0173072 A1 * | 9/2003 | Vinegar et al. | 166/66.5 |
| 2003/0173078 A1 * | 9/2003 | Wellington et al. | 166/250.07 |
| 2003/0173080 A1 * | 9/2003 | Berchenko et al. | 166/256 |

| Publication | Date | Inventor | Class |
|---|---|---|---|
| 2003/0173081 A1* | 9/2003 | Vinegar et al. | 166/272.1 |
| 2003/0173082 A1* | 9/2003 | Vinegar et al. | 166/272.2 |
| 2003/0173085 A1* | 9/2003 | Vinegar et al. | 166/302 |
| 2003/0178191 A1* | 9/2003 | Maher et al. | 166/65.1 |
| 2003/0183390 A1* | 10/2003 | Veenstra et al. | 166/302 |
| 2003/0192691 A1* | 10/2003 | Vinegar et al. | 166/250.12 |
| 2003/0192693 A1* | 10/2003 | Wellington | 166/267 |
| 2003/0194692 A1* | 10/2003 | Purdum | 435/2 |
| 2003/0196788 A1* | 10/2003 | Vinegar et al. | 166/57 |
| 2003/0196789 A1* | 10/2003 | Wellington et al. | 166/64 |
| 2003/0196801 A1* | 10/2003 | Vinegar et al. | 166/263 |
| 2003/0196810 A1* | 10/2003 | Vinegar et al. | 166/300 |
| 2003/0201098 A1* | 10/2003 | Karanikas et al. | 166/53 |
| 2003/0205378 A1* | 11/2003 | Wellington et al. | 166/302 |
| 2003/0208923 A1* | 11/2003 | Lewis | 34/471 |
| 2003/0209348 A1* | 11/2003 | Ward et al. | 166/256 |
| 2003/0221333 A1* | 12/2003 | Lam | 34/220 |
| 2004/0003592 A1* | 1/2004 | Viteri et al. | 60/651 |
| 2004/0016769 A1* | 1/2004 | Redmond | 222/3 |
| 2004/0020642 A1* | 2/2004 | Vinegar et al. | 166/245 |
| 2004/0023087 A1* | 2/2004 | Redmond | 429/19 |
| 2004/0025366 A1* | 2/2004 | Soucy | 34/230 |
| 2004/0031282 A1* | 2/2004 | Kopko | 62/271 |
| 2004/0040715 A1* | 3/2004 | Wellington et al. | 166/302 |
| 2004/0061819 A1* | 4/2004 | Faris et al. | 349/115 |
| 2004/0077090 A1* | 4/2004 | Short | 435/471 |
| 2004/0160538 A1* | 8/2004 | Li et al. | 349/16 |
| 2004/0194335 A1* | 10/2004 | Perret | 34/527 |
| 2004/0194371 A1* | 10/2004 | Kinnis | 47/17 |
| 2004/0207566 A1* | 10/2004 | Essig et al. | 343/878 |
| 2004/0210056 A1* | 10/2004 | Wood et al. | 546/216 |
| 2004/0211554 A1* | 10/2004 | Vinegar et al. | 166/60 |
| 2004/0211557 A1* | 10/2004 | Cole et al. | 166/242.1 |
| 2004/0211569 A1* | 10/2004 | Vinegar et al. | 166/380 |
| 2005/0000802 A1* | 1/2005 | Hobbs | 204/277 |
| 2005/0007505 A1* | 1/2005 | Faris et al. | 349/16 |
| 2005/0007506 A1* | 1/2005 | Faris et al. | 349/16 |
| 2005/0039388 A1* | 2/2005 | Wehner | 47/17 |
| 2005/0079333 A1* | 4/2005 | Wheatley et al. | 428/212 |
| 2005/0092483 A1* | 5/2005 | Vinegar et al. | 166/60 |
| 2005/0153410 A1* | 7/2005 | Hallberg et al. | 435/161 |
| 2005/0160617 A1* | 7/2005 | Fouts | 34/202 |
| 2005/0187677 A1* | 8/2005 | Walker | 701/16 |
| 2005/0241174 A1* | 11/2005 | Kolega et al. | 34/93 |
| 2005/0246919 A1* | 11/2005 | Delons | 34/93 |
| 2005/0249917 A1* | 11/2005 | Trentacosta et al. | 428/137 |
| 2005/0274067 A1* | 12/2005 | Morton et al. | 44/606 |
| 2005/0274293 A1* | 12/2005 | Morton et al. | 106/745 |
| 2005/0284167 A1* | 12/2005 | Morgan et al. | 62/272 |
| 2006/0010712 A1* | 1/2006 | Carin et al. | 34/443 |
| 2006/0010514 A1* | 1/2006 | Carin et al. | 34/514 |
| 2006/0026017 A1* | 2/2006 | Walker | 705/1 |
| 2006/0033674 A1* | 2/2006 | Essig et al. | 343/912 |
| 2006/0049305 A1* | 3/2006 | Porter | 244/31 |
| 2006/0053791 A1* | 3/2006 | Prentice | 60/645 |
| 2006/0101665 A1* | 5/2006 | Carin et al. | 34/513 |
| 2006/0101881 A1* | 5/2006 | Carin et al. | 71/21 |
| 2006/0131928 A1* | 6/2006 | Onizawa et al. | 296/146.15 |
| 2006/0174965 A1* | 8/2006 | Hobbs | 141/18 |
| 2006/0178445 A1* | 8/2006 | Mcintyre et al. | 523/122 |
| 2006/0201024 A1* | 9/2006 | Carin et al. | 34/576 |
| 2006/0206246 A1* | 9/2006 | Walker | 701/16 |
| 2006/0213657 A1* | 9/2006 | Berchenko et al. | 166/245 |
| 2006/0254079 A1* | 11/2006 | Gorbell et al. | 34/363 |
| 2006/0254080 A1* | 11/2006 | Carin et al. | 34/363 |
| 2006/0254081 A1* | 11/2006 | Carin et al. | 34/576 |
| 2006/0273223 A1* | 12/2006 | Haaland et al. | 244/129.2 |
| 2006/0280906 A1* | 12/2006 | Trentacosta et al. | 428/137 |
| 2007/0061946 A1* | 3/2007 | Webb | 2/410 |
| 2007/0062105 A1* | 3/2007 | Stevens | 47/17 |
| 2007/0074420 A1* | 4/2007 | Eriksson et al. | 34/275 |
| 2007/0082187 A1* | 4/2007 | Wang et al. | 428/292.1 |
| 2007/0098602 A1* | 5/2007 | Haueter et al. | 422/186 |
| 2007/0100122 A1* | 5/2007 | Crawford et al. | 528/272 |
| 2007/0100125 A1* | 5/2007 | Crawford et al. | 528/302 |
| 2007/0105993 A1* | 5/2007 | Germroth et al. | 524/115 |
| 2007/0106054 A1* | 5/2007 | Crawford et al. | 528/272 |
| 2007/0119602 A1* | 5/2007 | Haaland et al. | 169/14 |
| 2007/0119603 A1* | 5/2007 | Haaland et al. | 169/54 |
| 2007/0129531 A1* | 6/2007 | Germroth et al. | 528/272 |
| 2007/0151262 A1* | 7/2007 | Bailey | 62/93 |
| 2007/0163142 A1* | 7/2007 | Carin et al. | 34/282 |
| 2007/0175063 A1* | 8/2007 | Morgan et al. | 34/467 |
| 2007/0184238 A1* | 8/2007 | Hockaday et al. | 428/98 |
| 2007/0184274 A1* | 8/2007 | Wheatley et al. | 428/411.1 |
| 2007/0209799 A1* | 9/2007 | Vinegar et al. | 166/302 |
| 2007/0225470 A1* | 9/2007 | Di et al. | 528/196 |
| 2007/0256318 A1* | 11/2007 | Sugawara et al. | 34/93 |
| 2007/0259220 A1* | 11/2007 | Redmond | 429/12 |
| 2007/0266623 A1* | 11/2007 | Paoluccio | 44/629 |
| 2007/0271810 A1* | 11/2007 | Kelley et al. | 34/93 |
| 2007/0271814 A1* | 11/2007 | Bae et al. | 34/524 |
| 2008/0041364 A1* | 2/2008 | Brock | 126/621 |
| 2008/0047502 A1* | 2/2008 | Morse | 123/3 |
| 2008/0072450 A1* | 3/2008 | Kim et al. | 34/524 |
| 2008/0078100 A1* | 4/2008 | Kim et al. | 34/524 |
| 2008/0104858 A1* | 5/2008 | Carin et al. | 34/282 |
| 2008/0105019 A1* | 5/2008 | Carin et al. | 71/15 |
| 2008/0110043 A1* | 5/2008 | Carin et al. | 34/487 |
| 2008/0115950 A1* | 5/2008 | Haaland et al. | 169/62 |
| 2008/0138265 A1* | 6/2008 | Lackner et al. | 423/224 |
| 2008/0148592 A1* | 6/2008 | Kim et al. | 34/89 |
| 2008/0148597 A1* | 6/2008 | Kim et al. | 34/549 |
| 2008/0172899 A1* | 7/2008 | Carin et al. | 34/90 |
| 2008/0178819 A1* | 7/2008 | Sia et al. | 119/300 |
| 2008/0189979 A1* | 8/2008 | Carin et al. | 34/576 |
| 2008/0223269 A1* | 9/2008 | Paoluccio | 110/342 |
| 2008/0250715 A1* | 10/2008 | Cooper et al. | 48/197 FM |
| 2008/0263890 A1* | 10/2008 | Picard | 34/282 |
| 2008/0283247 A1* | 11/2008 | Zubrin et al. | 166/305.1 |
| 2008/0293857 A1* | 11/2008 | Crawford et al. | 524/147 |
| 2008/0293882 A1* | 11/2008 | Germroth et al. | 524/601 |
| 2008/0295220 A1* | 12/2008 | Webb | 2/171.3 |
| 2008/0296018 A1* | 12/2008 | Zubrin et al. | 166/267 |
| 2008/0314058 A1* | 12/2008 | Jones et al. | 62/235.1 |
| 2008/0314593 A1* | 12/2008 | Vinegar et al. | 166/302 |
| 2009/0008089 A1* | 1/2009 | Zubrin et al. | 166/250.15 |
| 2009/0013596 A1* | 1/2009 | Wang | 47/17 |
| 2009/0014170 A1* | 1/2009 | Zubrin et al. | 166/90.1 |
| 2009/0049763 A1* | 2/2009 | Blundell et al. | 52/81.1 |
| 2009/0061267 A1* | 3/2009 | Monzyk et al. | 429/21 |
| 2009/0062581 A1* | 3/2009 | Appel et al. | 585/241 |
| 2009/0093573 A1* | 4/2009 | Germroth et al. | 524/139 |
| 2009/0093574 A1* | 4/2009 | Crawford et al. | 524/141 |
| 2009/0145999 A1* | 6/2009 | Porter | 244/31 |
| 2009/0181434 A1* | 7/2009 | Aikens et al. | 435/105 |
| 2009/0183424 A1* | 7/2009 | Gorbell et al. | 44/505 |
| 2009/0186966 A1* | 7/2009 | Gallucci et al. | 524/96 |
| 2009/0188127 A1* | 7/2009 | Gorbell et al. | 34/388 |
| 2009/0189445 A1* | 7/2009 | Strizki | 307/21 |
| 2009/0205363 A1* | 8/2009 | de Strulle | 62/533 |
| 2009/0226308 A1* | 9/2009 | Vandor | 415/178 |
| 2009/0227003 A1* | 9/2009 | Blotsky et al. | 435/257.1 |
| 2009/0230040 A1* | 9/2009 | Limcaco | 210/151 |
| 2009/0230686 A1* | 9/2009 | Catlin | 290/54 |
| 2009/0255144 A1* | 10/2009 | Gorbell et al. | 34/385 |
| 2009/0323180 A1* | 12/2009 | Weber et al. | 359/359 |
| 2010/0000444 A1* | 1/2010 | Constantz et al. | 106/465 |
| 2010/0018113 A1* | 1/2010 | Bohlig et al. | 44/550 |
| 2010/0018228 A1* | 1/2010 | Flammang et al. | 62/115 |
| 2010/0031560 A1* | 2/2010 | Calabrese et al. | 44/550 |
| 2010/0086480 A1* | 4/2010 | Williams | 424/1.69 |

| | | | | |
|---|---|---|---|---|
| 2010/0087574 A1 * | 4/2010 | Crawford et al. ............ 524/141 | | |

FOREIGN PATENT DOCUMENTS

| | | | |
|---|---|---|---|
| CH | 641743 A5 | * | 3/1984 |
| JP | 03156282 A | * | 7/1991 |
| JP | 04317697 A | * | 11/1992 |
| JP | 06159934 A | * | 6/1994 |
| WO | WO 2007/002733 | * | 1/2007 |

* cited by examiner

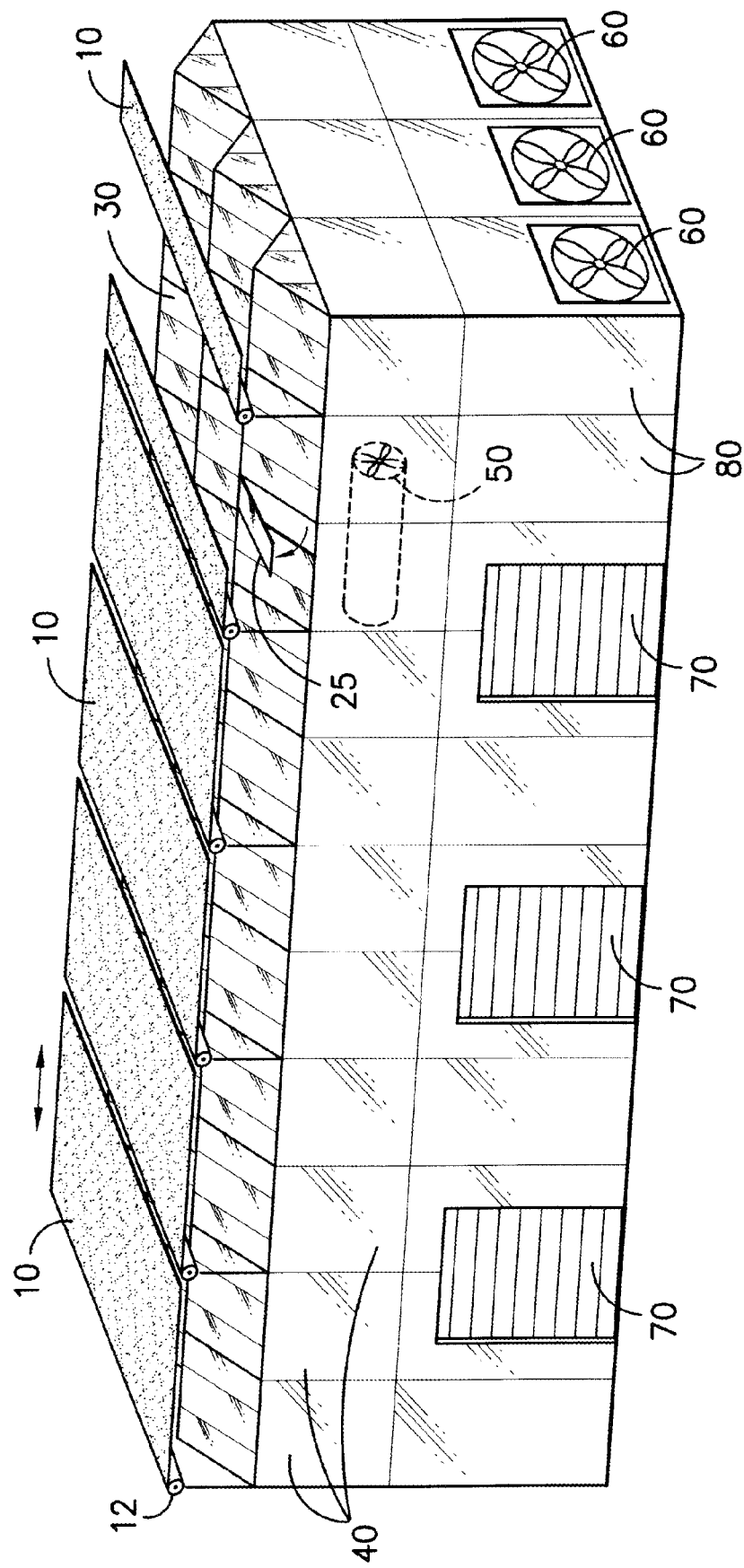
FIG. -1-

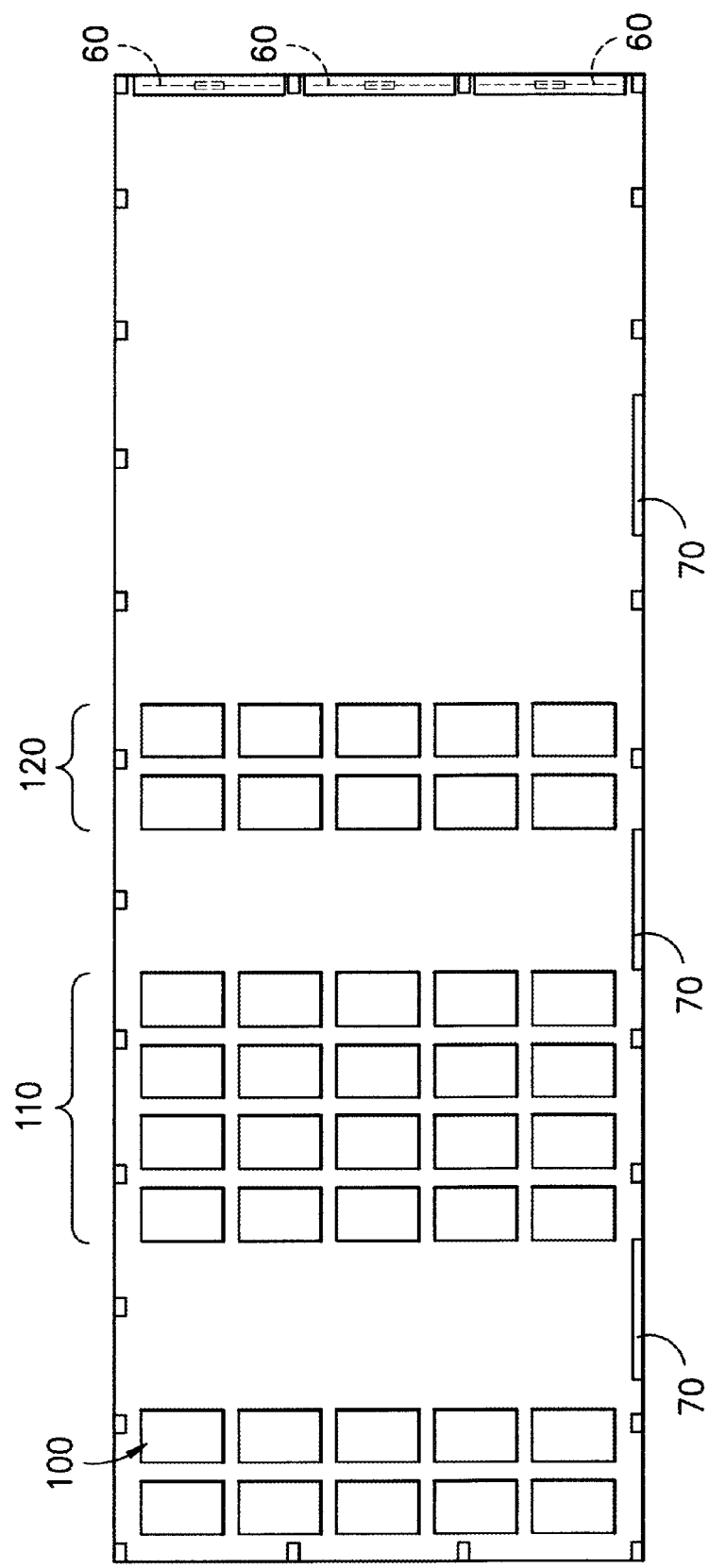
FIG. -2-

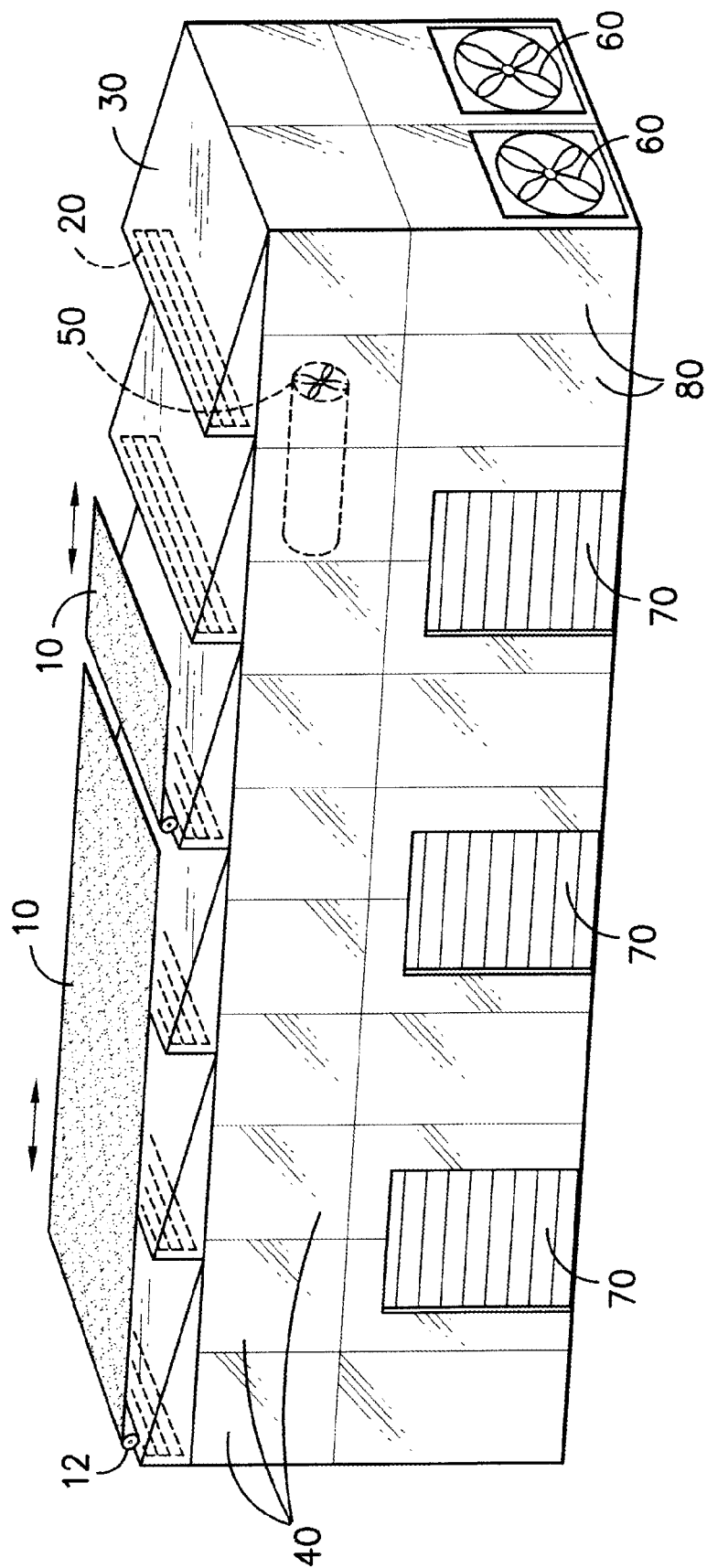
FIG. -3-

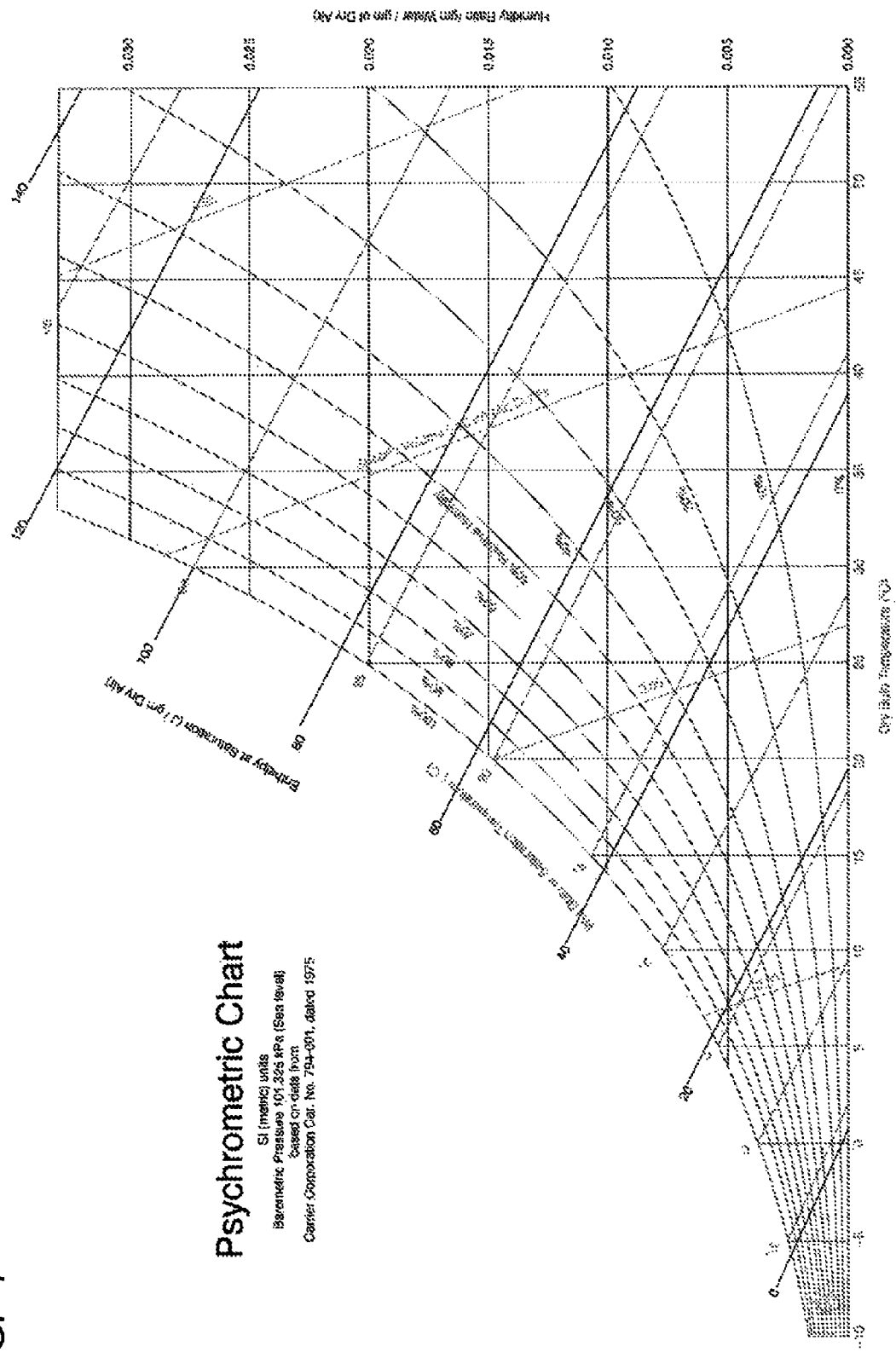
FIG. -4-

WOOD-DRYING SOLAR GREENHOUSE

CROSS-REFERENCE TO RELATED APPLICATIONS

This application claims the benefit of U.S. Provisional Application No. 60/949,860, filed on Jul. 15, 2007.

TECHNICAL FIELD

The field to which the disclosure generally relates includes drying process for wood based materials and greenhouse.

BACKGROUND

Greenhouses have been used extensively for growing agricultural products including vegetables, fruits, flowers and other indoor plants where a narrow range of desired temperature is required for the viable biological processes of plants. When the interior temperature of the greenhouse is outside the range, the plants can suffer from irreversible loss or die. It is not critical, however, to control the relative humidity inside an agricultural greenhouse as long as sufficient moisture is supplied to the soil. It is undesirable to remove much moisture from an agricultural greenhouse because extra water would be provided to the soil or the plant would be dehydrated.

Wood drying is normally achieved by using a kiln apparatus, which is heated by steam or direct heating sources including wood or gas furnaces. A kiln apparatus consumes significant amount of fuel or electricity, and thus expensive to operate. Relative high temperature in a kiln apparatus can also cause internal stresses in a wood product, resulting in deformation or cracks. Wood can be air dried by putting wood under covered spaces with adequate air circulations. Air-drying requires extended drying time and is less controllable due to natural variation of weather conditions.

SUMMARY OF EXEMPLARY EMBODIMENTS OF THE INVENTION

A method of drying comprises placing a moist material inside a substantially enclosed solar greenhouse. The greenhouse comprises at least one light transmission roof and/or wall panel that is substantially transparent to solar radiation, but resistant to convective and conductive heat transfer. The temperature and relative humidity inside the greenhouse are maintained within their pre-determined ranges while the moist material is allowed to dry. A wood based material manufactured using the drying method exhibits improved properties.

A solar greenhouse for product drying comprises a plurality of roof and wall panels that are substantially transparent to solar radiation and resistant to convective and conductive heat transfer. The greenhouse also comprises a humidity measuring device and a humidity control mechanism for effective removal of interior moisture while maintaining the interior relative humidity within a pre-determined range.

Other exemplary embodiments of the present invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein:

FIG. 1 is a drawing of an exemplary solar greenhouse in a perspective view according to one embodiment of the invention.

FIG. 2 is a drawing of an exemplary greenhouse in a top view.

FIG. 3 is a drawing of another exemplary solar greenhouse in a perspective view.

FIG. 4 is a psychrometric chart.

DETAILED DESCRIPTION OF EXEMPLARY EMBODIMENTS

The following description of the embodiment(s) is merely exemplary in nature and is in no way intended to limit the invention, its application, or uses. Unless specifically stated, the process embodiments described herein are not constrained to a particular order or sequence. Additionally, some of the described embodiments or elements thereof can occur or be performed at the same point in time.

Any moist materials may be dried using the drying method and greenhouse described below. Wood based materials effectively dried using the method exhibit improved properties.

The term wood based material herein includes any solid materials that comprise fibers of cellulose and/or hemicellulose. The wood based material may comprise any wood species in any geometric shapes. Suitable wood species may include, but not limited to, soft wood, hard wood (maple, oak, as examples), pressure treated wood, bamboo, corn stalk, sugar cane bagasse, straw stalks (such as rice straw and wheat straw), seed flax stalk and any hybrid wood materials. Specific examples of wood species may include Radiata Pine, Scots Pine, Red Pine, Yellow Pine, Maple, Alder, Birch, Aspen, Balsawood, and Beech. The wood based material may be a wood sheet, wood fibers, green lumber, pre-treated lumber, beam, plank, wood chip, wood powder, dimensional lumber, veneer, panels, engineered wood such as plywood, laminated veneer lumber (LVL) and wafer boards veneer.

The wood based material may include voids in at least a portion of the material. Typical voids are cell voids formed during the formation of the wood as part of a tree. The voids may be interconnected to form channels. Water, or aqueous solutions may be able to fill the voids and transport through the channels. Soft wood materials tend to include larger size channels, and higher volume fraction of voids. Voids may also be created artificially by any known chemical or mechanical processes, such as etching and incising. The size of the voids may range from nanometers to millimeters in terms of the maximal linear dimension of the void cross-section.

A wood based product may be treated by impregnation with a treatment composition through the voids and channels of the material structure. Various treatment compositions and solutions may be used. Typical treatment composition may include aqueous or non-aqueous mixtures containing preservatives, insecticides, flame retardants, colorants, wood hardeners, water and UV protectors, and the like. Examples of components in a typical treatment composition may include one or more of chromated copper arsenate, alkaline copper quaternary (ACQ), acid copper chromate, copper azole, copper-HDO (Bis-(N-Cyclohexyldiazeniumdioxy)-copper), copper chromate, copper citrate, micronized copper, boric acid, boric oxides, borate salts, sodium silicate, potassium silicate, bifenthrin, permethrin, copper naphthenate, copper dimethyidithiocarbamate (CDDC), reactive wood hardening resins, and copper oxide. The treatment composition may be applied to the wood based material through a pressure process or non-pressure process. Non-pressure processes may include brushing, spraying, dipping, soaking, steeping or by means of hot and cold bath. Pressure processes are typically carried out in closed cylinders with applied pressure and/or a vacuum. The use of elevated pressure allows deeper and more uniform penetration and a higher absorption of a treatment composition. Additionally, the treatment conditions(such as pressure, temperature, duration, number of treatment cycles, and composition) may be controlled so that retention and penetration can be varied. The wood based material may be loaded onto special tram cars, so called "buggies," and into the cylinder. These cylinders are then set under pressure, optionally with the addition of higher temperature. In a subsequent step, a vacuum may be used to extract excess treatment composition. These cycles of pressure and vacuum can be repeated to achieve better penetration if desired. After the pressure or nonpressure treatment process, the void and channels of the wood based material are typically filled with the treatment composition to a significant extent. Since an aqueous composition is typically used in the processes, water content in the treated wood material at this stage may range from about 30% to about 300% based on the weight the dry material. After the treatment process, the moisture inside the material needs to be reduced to a lower level.

The wood based material may contain water absorbed by the cellulose or hemicellulose fibers, and liquid water contained inside the voids and channels. The maximal percentage of absorbed water by the cellulosic fibers in the wood based material is referred to as fiber saturation point. A fiber saturation point may range from 20% to 30% by weight. When moisture content of a wood based material is beyond its fiber saturation point, there is liquid water or aqueous composition inside the voids and/or channels. The water inside the voids and channels can be desirably removed by drying, preferably without adversely affecting the mechanical or chemical properties of the material. A high temperature kiln oven may be used to dry the wood based material. High temperature drying, however, may cause excessive expansion or gasification of liquid water inside the wood channels in addition to uneven temperature distribution across the material, resulting in internal stresses, deformation and cracks.

A moist wood based material may be dried inside the greenhouse described below, powered substantially by solar radiation configured to remove moisture under controlled conditions. The moist wood material may be stacked together to form a drying unit that is configured to be lifted and moved by a forklift truck or other transportation or lifting tools.

FIG. 1, a perspective view of an exemplary solar greenhouse, is shown in a schematic drawing. As shown in FIG. 1, the exemplary greenhouse includes a plurality of light transmission roof panels 30, upper wall panels 40, lower wall panels 80, retractable shade screens 10, circulation fans 50, vent fans 60 and doors 70. FIG. 2 is a top view of the greenhouse shown in FIG. 1. An exemplary layout of drying units 100 of wood based materials, having a drying unit width represented by 120, is also shown in FIG. 2. FIG. 3 shows a perspective view of another exemplary greenhouse having a different roof design. An adjustable shutter 20 is provided as a roof vent. The roof panel 30 and wall panel 40 may comprise a clear solid sheet of glass, plastic or composite material that is substantially transparent to solar radiation (greater than about 40% transmission of heat generating radiation in about 280 nm to 2500 nm wavelength range), but resistant to convective and conductive heat transfer. Resistance to convective heat transfer is herein referred to as the impermeability of gas flow through the sheet material. Resistance to conductive heat transfer is herein referred to as thermal conductivity of the panel material less than about 10 W/mK (Watts per meter per Kelvin). Panel materials having thermal conductivity less than 5, 1, or 0.5 W/mK are therefore suitable for providing resistance to conductive heat transfer. Non-limiting examples of light transmission panels may include solid sheets or films of various glasses, plastics (such as polycarbonate, Plexiglas®, polyacrylics, polyolefin, and polystyrene), laminated glasses, glass fiber reinforced laminates, and the like. The light transmission panels allow solar radiation to reach inside the solar greenhouse to heat up the interior materials including the floor material, the wood based materials, interior air, and other heat sinks that may be optionally included. The light transmission panels also act as a thermal barrier to prevent heat loss to the outside environment. The lower wall panel 80 may comprise a light transmission panel or any other known panel material.

The doors of the solar greenhouse may comprise a light transmission panel or any other door material. A curtain type door or clear plastic flaps may also be used as the door material. The greenhouse may include a plurality of doors to allow easy transportation of wood based materials in and out of the greenhouse. The width of the door may be large enough for forklift trucks or other transportation or lifting equipments to pass through. In addition, the spacing between two neighboring doors may be at least two times the width of the drying unit containing a transportable package of the wood based material. As shown in FIG. 2 in an example, a plurality of drying units 100 are placed inside the greenhouse for drying. The width of the drying unit is represented by numeral 120. The spacing between two neighboring doors 70 is about twice the width of the drying unit as represented by numeral 110.

The greenhouse includes a means for controlling ventilation (such as air exchange between the interior and exterior of the greenhouse). The means for controlling ventilation may include a simple adjustable opening, a door, a vent fan, thermostat controlled vent fans, an adjustable roof vent, a shutter, a window, and any equivalent thereof. The means for controlling ventilation may be included in the roof and/or wall sections of the greenhouse. As illustrated in FIG. 3, an adjustable roof shutter 20 and two ventilation fans 60 provide the air ventilation between the interior and exterior of the greenhouse. A roof panel may be attached to the roof in a rotational or sliding relationship with the roof framework. The roof panel can be lifted up, rotated, shifted or tilted manually or by an electromechanical device to provide an adjustable roof vent. As shown in FIG. 1, a roof panel 25 is attached to the roof framework in a rotational relationship through a hinge connection on one edge of the panel. The roof panel 25 can be lifted or tilted outward on the opposite side of the hinge connection manually or by a motor controlled movement to various degrees. A roof vent with adjustable size of opening is thus created. All or a certain portion of the roof panels may be installed in a similar manner to enable sufficient roof vent capacity.

The greenhouse may include a means for controlling exposure to solar radiation. The means for controlling solar radiation may include a shade screen (retractable manually or automatically controlled by an electric motor), a switchable smart glass panel, and any equivalent thereof. The means for controlling solar radiation is capable of adjusting the amount of solar radiation exposure for an effective rate of heating inside the greenhouse. A shade screen may be a cloth, a film, or a laminated or coated sheet material. The shade screen may comprise an incorporated solar radiation absorbing and/or reflecting colorant (dye and/or pigment). The shade screen may be provided in the form of a roller shade that can be pulled out to cover at least a portion of the roof or retracted back into the core of the roller to expose the roof to the solar radiation. The operation of the roller shade may be conducted manually or by an electromechanical device such as an electric motor. As shown in FIG. 1, a plurality of shade screens 10 are provided in the form of roller shades 12 outside the roof panels. The shade screen 10 may be extended or retracted to various degrees as illustrated, manually or by an electric motor. The roller shade 12 may be supported on a framework attached to the mainframe of the greenhouse. Switchable smart glasses may also be used as means for controlling solar radiation. Switchable smart glass refers to electrically switchable glass or glazing which changes light transmission (including solar radiation) properties when a voltage is applied. Depending on the voltage applied, the switachable smart glass can thus control the amount of light and heat passing through the material. The switchable smart glass may be based on one or more of an electrochromic devices, suspended particle devices, and liquid crystal devices. It may be used in addition to or in place of the shade screen. The switchable smart glasses can also be used as roof panels and/or wall panels. Examples of commercial switchable smart glasses are available from Elmont Glass Company, Inc. in Garden City Park, N.Y., and Paragon Architectual Products, LLC, in Scottsdale, Ariz.

The greenhouse may optionally include a solar panel that is capable of storing, collecting and/or converting solar energy. The solar panel may comprise a photovoltaic device capable of collecting and converting solar radiation into electricity. The solar panel may be used to supply electricity to a circulation fan, a ventilation fan, an electromechanical device for controlling the adjustment of shade screen or ventilation opening or switchable smart glass, a rechargeable battery, a dehumidifier, or a supplemental heating unit inside the greenhouse. The solar panel may be positioned next to the greenhouse, or attached to the wall or roof structure of the greenhouse.

The greenhouse may optionally include a supplemental heating unit. A heat exchanger with external steam, hot water, hot oil, or electricity as its energy supply may be used to provide additional heat when solar radiation is not sufficient to generate the desired condition for drying the wood based material.

The greenhouse may desirably include a humidity measuring device and a humidity control mechanism. Wet and dry bulb temperature measurements, relative humidity sensors (including capacitive sensors and resistive sensors), dewcells, infra-red humidity sensors and/or a psychrometer or hygrometer may be used to monitor the humidity inside and outside the greenhouse. Moisture content (also called humidity ratio) of air is herein defined as a ratio of kilograms of water vapor per kilogram of dry air at a given pressure. Moisture content does not change with temperature except when the air cools below its dewpoint. Moisture content or humidity ratio may be calculated or measured based on relative humidity, wet/dry bulb temperature, and/or other measurements using psychrometrics. Information on psychrometric charts and calculation can be found in "*Handbook of Psychrometric Charts—Humidity diagrams for engineers*," by David Shallcross, published by Springer; 1st edition, Aug. 31, 1997. A psychromatric chart is provided in FIG. 4 to illustrate how moisture content is related to dry bulb temperature, web bulb temperature and relative humidity. The psychrometric chart can thus be used to determine the moisture content of air inside and outside the greenhouse. The humidity measuring devices may be configured or positioned to measure relative humidity of air inside and outside the greenhouse. For example, two humidity-measuring devices may be provided with the greenhouse, one positioned on the exterior surface of the greenhouse and the other positioned inside the greenhouse. The measurements from both humidity devices are provided to a humidity control mechanism that is capable of facilitating the removal of interior moisture for drying of the moist materials while maintaining interior relative humidity within a pre-determined range. The humidity control mechanism may include one or more of: (a) determination of the moisture content of air inside and out the greenhouse, (b) determination of moisture content of the moist material, (c) configuration of the means for controlling ventilation, (d) configuration of means for controlling solar radiation exposure, (e) configuration of de-humidifier if included, (f) configuration of humidistat, (g) configuration of supplemental heating unit, (h) determination of air temperature inside and outside the greenhouse, and (i) configuration of thermostat. The mechanism may be a collection of various components and devices of the greenhouse along with their configuration, input and output to form a set of controlled drying configuration and operation. The control of humidity does not necessarily mean maintaining interior relative humidity to a targeted value. The humidity control mechanism may include actively changing relative humidity within the pre-determined range in various schedules or patterns to allow effective drying of the moist material. The configuration may include a particular setting, program, schedule, or instruction for operation and/or measurements. The means for controlling ventilation, for example, may be configured to start ventilation when the interior relative humidity reaches a value near the maximum of the pre-determined range, and to stop ventilation when moisture content of the interior air is near the moisture content of the exterior air. For another example, the relative humidity may be allowed to rise by closing all vents and retracting the shade screens. When the relative humidity is near the upper limit of the pre-determined range, interior air is vented until the relative humidity is near the lower limit. Optionally, the solar greenhouse may include a humidistat used to measure and control the humidity of the interior air using the means for controlling ventilation as described above and/or a de-humidifier unit. Any known humidistats and de-humidifiers may be used with the solar greenhouse. One or more thermometer or temperature sensor may also be used to provide dry bulb temperature measurement of interior and exterior air. Similarly, a thermostat may be optionally provided and operated in conjunction with the humidity control mechanism for maintaining the interior temperature and humidity within their pre-determined ranges.

The method of drying and configuration of the solar greenhouse described above may utilize the psychrometric information and measurements to set proper venting program, temperature and humidity adjustments. When the moisture content inside the greenhouse is greater than the moisture content of air outside the greenhouse, the interior air may be vented or exchanged with outside air at a controlled rate regardless of the temperature difference between the outside and inside of the greenhouse. A desired and pre-determined interior temperature range and humidity range may be chosen depending on the nature of the particular batch of wood based material to be dried and its moisture content. The venting schedule and rate of venting is then controlled by the humidity control mechanism such that the moisture inside the greenhouse can be partially removed based on the moisture content differential between the interior and exterior air, while the interior temperature and humidity are maintained within their pre-determined ranges. Venting can typically be carried out unless the moisture content of interior air is not higher than that of exterior air, or the interior air temperature or relative humidity drifts outside their pre-determined ranges. The humidity control mechanism may allow the interior moisture content to rise significantly higher than the moisture content of exterior air before means for controlling ventilation is open, especially when this is a significant temperature difference between inside and outside air. A wide range of temperature and interior relative humidity may be allowed for various wood based materials. A typical temperature range may be 20° C. to 65° C. or 30° C. to 50° C., and relative humidity range of about 30% to about 95% or about 50% to about 80%. The wood based material can be dried to a moisture content below, near or above its fiber saturation point using this method. The moisture content of a dried wood based material may range from about 10% to about 50%. The above method and configuration result in consistent removal of moisture inside the greenhouse and a controlled drying of the wood based material inside the greenhouse. A wood based material dried by the above method exhibits a relative uniform moisture distribution throughout the material structure and less internal stress that may contribute to cracking, deformation or dimension changes.

Any combinations of wood based materials, treatment processes, greenhouse configurations and greenhouse-drying processes, may be used to achieve a desired result. For example, a wood based material is first pressure treated with an aqueous composition comprising at least one of a preservative, an insecticide, a UV stabilizer, a flame retardant and a wood hardener. The treated wood based material, having a moisture content between about 30% and about 300%, or between about 50% and about 200%, may be placed inside the solar greenhouse having an interior temperature between about 20° C. and 60° C. The pre-determined interior relative humidity ranges from about 30% to 80%. When the moisture inside the material evaporates, the interior moisture content of the greenhouse will rise. A schedule of venting the high moisture content interior air is carried out while maintaining the interior temperature and relative humidity within their pre-determined ranges by the means of ventilation and solar exposure control until the wood based material reaches its target moisture content.

The method of drying and the solar greenhouse according to this invention may be used to manufacture various products such as wood veneer, wood floor, interior and exterior wood furniture, wood beams, wood boards, plywood and wood laminates.

The greenhouse and the process described above may also be used to condition a wood based material to reach a target moisture content, remove internal stresses or reach a stable dimension or physical configuration.

The above description of embodiments of the invention is merely exemplary in nature and, thus, variations thereof are not to be regarded as a departure from the spirit and scope of the invention.

What is claimed is:

1. A method of drying comprising:
    placing a moist material inside a substantially enclosed solar greenhouse, said greenhouse comprising at least one light transmission roof and/or wall panel that is substantially transparent to solar radiation having at least 40% transmission of solar radiation in 280 nm to 2500 nm range, but resistant to convective and conductive heat transfer having a thermal conductivity of less than about 1 W/mK;
    maintaining the interior air temperature between about 20° C. and about 65° C., and relative humidity between about 30% and 95% to facilitate consistent removal of interior moisture content of said green house and a controlled drying of said moist material such that the moisture content of said moist material reaches between about 10% and 50%;
    measuring moisture content of the interior and exterior air of said greenhouse; wherein said moisture content of air is defined as the ratio of kilogram of water vapor per kilogram of dry air and
    venting the interior air using an element for controlling ventilation if moisture content of the interior air is greater than that of the exterior air;
    wherein said element comprises an adjustable roof vent.

2. A method of drying as set forth in claim 1, wherein said roof and/or wall panel comprises a sheet or a film of at least one of glass, polycarbonate, polyacrylics, Plexiglas®, polyolefin and composite.

3. A method of drying as set forth in claim 1, wherein said greenhouse further comprises a means for controlling exposure to solar radiation, wherein said means comprises at least one of a shade screen and a switchable smart glass panel.

4. A method of drying as set forth in claim 1, wherein said interior temperature is maintained in a range from about 20° C. to about 60° C. by controlling ventilation, solar radiation exposure, and/or supplemental non-solar heating.

5. A method of drying as set forth in claim 1, wherein said moist materials is a wood based material that has been treated by impregnation with an aqueous composition and its moisture content is about 30% to 300% based on the weight of said wood based material.

6. A method of drying as set forth in claim 1, wherein said greenhouse further comprises a photovoltaic solar panel configured to provide electricity to at least one of a circulation fan, a ventilation fan, a rechargeable battery, an electro-mechanical device controlling the adjustment of shade screen or ventilation opening, and a supplemental heating unit.

7. A product manufactured according to the method as set forth in claim 1.

8. A product as forth in claim 7, wherein said material is a wood based material.

9. A product as set forth in claim 8, and said moist material comprises a soft wood, hard wood, pressure treated wood, bamboo, corn stalk, sugar cane bagasse, straw stalks, seed flax stalk, engineered wood or any hybrid wood materials.

10. A product as set forth in claim 8, wherein said wood based materials is treated with a composition comprising at least one of a preservative, a flame retardant, a insecticide, a wood hardener, a colorant, and a UV stabilizer.

11. A product as set forth in claim 8, wherein said product has a substantially uniform moisture content throughout its structure and significantly less deformation or fewer cracks due to internal stress created during the drying process in comparison to a conventional high temperature kiln drying process.

12. A method of drying comprising:
    placing a moist material inside a substantially enclosed solar greenhouse, said greenhouse comprising at least one light transmission roof and/or wall panel that is substantially transparent to solar radiation having at least 40% transmission of solar radiation in 280 nm to 2500 nm range, but resistant to convective and conductive heat transfer having a thermal conductivity of less than about 1 W/mK;
    maintaining the interior air temperature between about 20° C. and about 65° C., and relative humidity between about 30% and 95% to facilitate consistent removal of interior moisture content of said green house and a controlled drying of said moist material such that the moisture content of said moist material reaches between about 10% and 50%;
measuring moisture content of the interior and exterior air of said greenhouse; wherein said moisture content of air is defined as the ratio of kilogram of water vapor per kilogram of dry air and venting the interior air using an element for controlling ventilation if moisture content of the interior air is greater than that of the exterior air;
wherein said element comprises a thermostat controlled vent fan.

* * * * *